US008663470B2

(12) United States Patent
Foucault et al.

(10) Patent No.: US 8,663,470 B2
(45) Date of Patent: Mar. 4, 2014

(54) LIQUID FILTER CARTRIDGE, AND AN ENGINE SUBASSEMBLY INCLUDING SUCH A CARTRIDGE

(75) Inventors: Eric Foucault, Ponthevrard (FR); Daniel Fertil, Saint Lubin de la Haye (FR)

(73) Assignee: Filtrauto, Guyancourt (FR)

( * ) Notice: Subject to any disclaimer, the term of this patent is extended or adjusted under 35 U.S.C. 154(b) by 1344 days.

(21) Appl. No.: 12/020,337

(22) Filed: Jan. 25, 2008

(65) Prior Publication Data
US 2008/0179238 A1    Jul. 31, 2008

(30) Foreign Application Priority Data

Jan. 29, 2007 (FR) ..................................... 07 00599
Aug. 24, 2007 (FR) ..................................... 07 05999

(51) Int. Cl.
*B01D 35/30* (2006.01)
(52) U.S. Cl.
USPC ............ 210/234; 210/232; 210/235; 210/443
(58) Field of Classification Search
USPC ................................. 210/248, 234, 235, 232
See application file for complete search history.

(56) References Cited

U.S. PATENT DOCUMENTS

| | | | | |
|---|---|---|---|---|
| 4,632,682 A | * | 12/1986 | Erdmannsdorfer | 55/498 |
| 5,300,223 A | * | 4/1994 | Wright | 210/232 |
| 5,468,386 A | * | 11/1995 | Ardes | 210/248 |
| 7,507,339 B2 | * | 3/2009 | Gilles et al. | 210/235 |
| 7,682,508 B2 | * | 3/2010 | Girondi | 210/234 |
| 2004/0232063 A1 | * | 11/2004 | Cline et al. | 210/433.1 |
| 2006/0219626 A1 | * | 10/2006 | Dworatzek et al. | 210/443 |
| 2007/0131607 A1 | * | 6/2007 | Nawa et al. | 210/435 |
| 2007/0227959 A1 | * | 10/2007 | Sinur et al. | 210/232 |

FOREIGN PATENT DOCUMENTS

| | | |
|---|---|---|
| DE | 3344568 | 6/1985 |
| DE | 3432855 | 3/1986 |
| WO | WO-2004/087290 | 10/2004 |

OTHER PUBLICATIONS

Preliminary Search Report for FR 0700599, dated Aug. 28, 2007.

* cited by examiner

*Primary Examiner* — Tony G Soohoo
*Assistant Examiner* — Peter Keyworth
(74) *Attorney, Agent, or Firm* — Marshall, Gerstein & Borun LLP

(57) ABSTRACT

A liquid filter cartridge comprising an outer casing defining an inside volume containing a filter element that separates the inside volume into an upstream space and a downstream space, the casing having an end wall defining a liquid inlet passage communicating with the upstream space, and a liquid outlet passage communicating with the downstream space, the casing being adapted for mounting on a support that includes a liquid inlet channel designed to communicate with the inlet passage, a liquid outlet channel designed to communicate with the outlet passage, and a drain channel communicating with the inlet passage. The cartridge includes a closure member fastened to the end wall of the casing and adapted to close the drain channel when the cartridge is mounted on the support.

22 Claims, 6 Drawing Sheets

US 8,663,470 B2

LIQUID FILTER CARTRIDGE, AND AN ENGINE SUBASSEMBLY INCLUDING SUCH A CARTRIDGE

FIELD OF THE INVENTION

The present invention relates to liquid filter cartridges and to engine subassemblies including such a cartridge.

BACKGROUND OF THE INVENTION

More particularly, the invention relates to a liquid filter cartridge (e.g. for engine lubricating oil) comprising an outer casing defining an inside volume containing a filter element that separates said inside volume into an upstream space and a downstream space, the casing including an end wall defining at least one liquid inlet passage communicating with the upstream space, and a liquid outlet passage communicating with the downstream space, said casing being adapted to be mounted on a support that includes a liquid inlet channel designed to communicate with the inlet passage, a liquid outlet channel designed to communicate with the outlet passage, and a drain channel communicating with the inlet passage.

Document DE-A-3 432 855 discloses such a filter cartridge mounted on an engine block and including a movable plug that closes the drain channel when the cartridge is mounted on the engine block and that opens said drain channel when the cartridge is removed. The system described in that document requires a moving part to be fitted to the engine block and thus requires the manufacturer to assemble parts to the casting of the engine block. That system is therefore complex and expensive.

SUMMARY OF THE PRESENT INVENTION

A particular object of the present invention is to mitigate those drawbacks.

To this end, according to the invention, the filter cartridge includes a closure member fastened to the end wall of its casing and adapted to close the drain channel when the cartridge is mounted on the support.

By means of these dispositions, the risk of spilling the liquid when removing the cartridge from the support is eliminated, but without that requiring additional moving parts to be fitted to the engine block for draining the oil located upstream from the inlet passage to the cartridge at its interface with the support. In addition, the closure member can be made in inexpensive manner, since said closure member is changed together with the filter cartridge.

In various embodiments of the filter cartridge of the invention, recourse may optionally also be had to one or more of the following dispositions:

the closure member is mounted to move with lost motion relative to the end wall of the casing and is resiliently biased away from the end wall.

The closure member includes an annular side wall that extends around a central axis between:
  a first end adjacent to the end wall and connected to said end wall with a certain amount of axial clearance; and
  a second end that is remote from said end wall;
  said end wall including an annular sealing bearing surface adapted to come into leaktight contact with the support and surrounding said side wall;
  the second end of the side wall of the closure member is extended radially inwards by an inwardly-directed collar adapted to come into leaktight contact against the support, closing the drain channel;
  the end wall of the casing includes an inwardly-directed rim, and the first end of the side wall of the closure member includes at least one outwardly-projecting rim co-operating with said inwardly-directed rim by catching against it.

The inwardly-directed rim is a metal washer crimped to the peripheral wall of the casing, the washer carrying a gasket, the gasket constituting the sealing bearing surface;
  the closure member is resiliently biased by at least one spring interposed between the end wall of the casing and the annular side wall;
  the closure member includes a gasket for closing the drain channel in leaktight manner when the cartridge is mounted on the support;
  the closure member includes a base fitted with an annular gasket enabling the drain channel to be closed in leaktight manner when the cartridge is mounted on the support.

The gasket is fastened to a first end of a part of the closure member, said part including, at an opposite second end, a catch portion for catching the end wall of the casing.

The spring comprises a resilient ring extending radially between an outer first end connected to the side wall of the closure member, and an inner second end bearing against the end wall of the casing.

The spring comprises spring blades each having a first end connected to the side wall of the closure member and an opposite end bearing against the end wall of the casing.

The spring is a spring blade secured to the end wall of the casing and engaged in a notch formed in the first end of the annular side wall, said notch being open towards the end wall.

The closure member is resiliently biased by a helical spring interposed between the end wall of the casing and said inwardly-directed collar;
  the collar includes centering fingers extended towards the end wall of the casing and co-operating with said spring;
  the height of a catch cavity in the end wall of the casing is greater than the height of a catch portion of the closure member mounted to move with lost motion in the catch cavity;
  a sealing bearing surface gasket is provided on the casing, the gasket being suitable for coming into leaktight contact with the support and including a resilient deformation range that is greater than the lost motion of the closure member relative to the end wall of the casing; and
  the cartridge includes an anti-drainage valve connected to the outlet passage and adapted to open only when the pressure prevailing in the downstream space is greater than a predetermined value.

The invention also provides an engine subassembly comprising a support having a filter cartridge of the invention releasably mounted thereon, said support including a liquid inlet channel that communicates with the inlet passage of the filter cartridge, a liquid outlet channel that communicates with the outlet passage of the filter cartridge, and a drain channel communicating with the inlet passage of the filter cartridge, said drain channel normally being closed by the closure member.

In the subassembly of the invention, recourse may optionally also be had to one or more of the following dispositions:
  an annular inlet housing defined by the support is connected to the inlet channel;
  the outlet passage is central and the inlet passage comprises a plurality of orifices formed through the end wall around the outlet passage, the outlet channel being central and the annular housing being around the outlet channel;

the support includes a sealing portion in relief projecting into the annular housing, the sealing portion in relief defining a drain inlet in the annular housing, the inlet normally being closed by the closure member;

the annular housing includes at least one equilibrium housing in relief;

the support includes at the periphery of the annular inlet housing a sealing surface co-operating with the sealing bearing surface of the cartridge, the support including an outer margin at the periphery of the sealing surface; and the height to the margin is not less than the lost motion of the closure member relative to the end wall of the casing.

BRIEF DESCRIPTION OF THE DRAWINGS

Other characteristics and advantages of the invention appear from the following description of several embodiments, given as non-limiting examples, and with reference to the accompanying drawings, in which.

DETAILED DESCRIPTION OF THE INVENTION

In the various figures, the elements that are identical or similar are designated by the same references.

Figure 4:
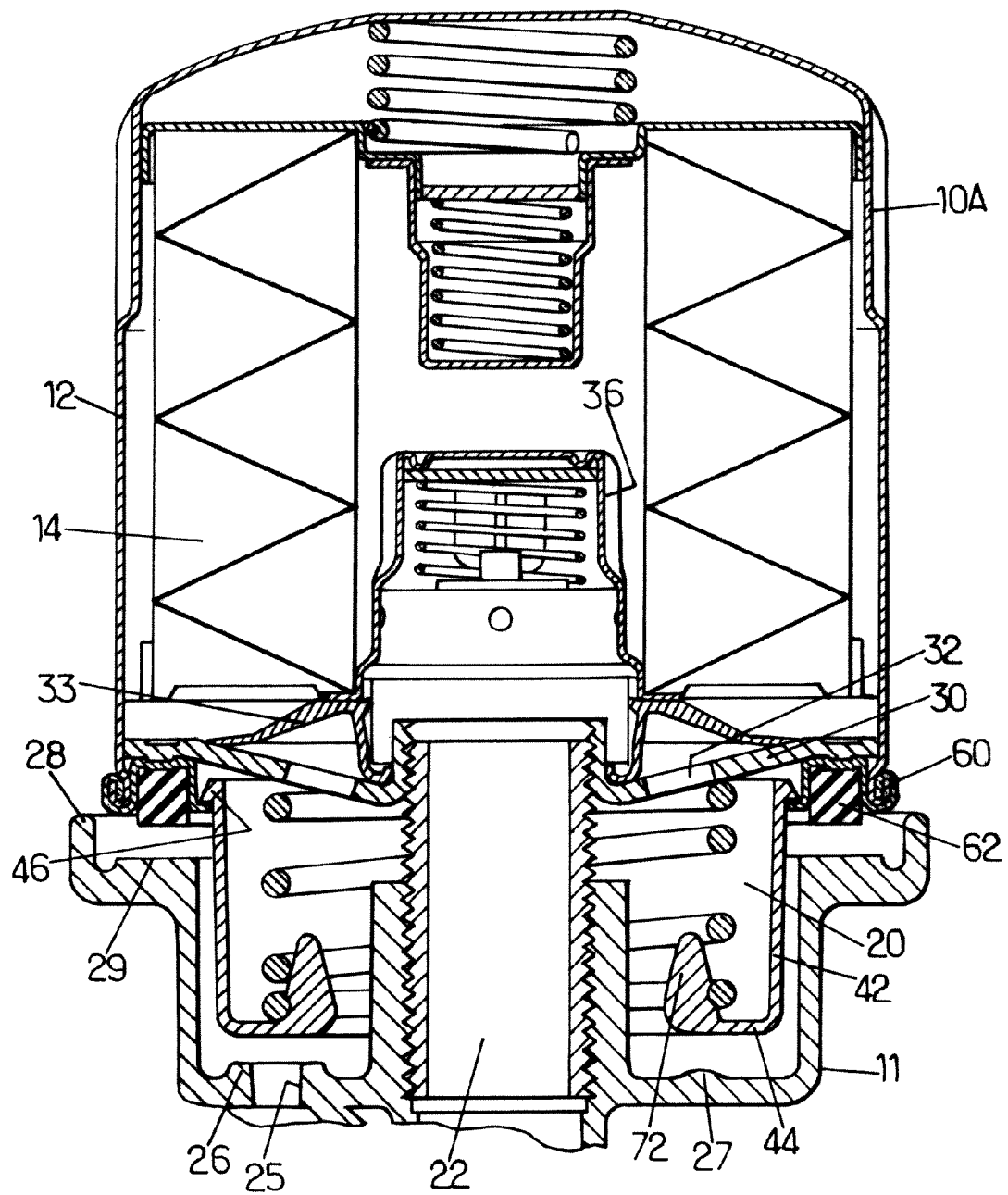
FIG. 4 is a section view of a filter cartridge and of the support forming the subassembly of the invention, with the filter cartridge being in a partially-dismounted position.

The cartridge 8 of the invention comprises an outer casing 10 defining an inside volume 12 containing a filter element 14. The casing comprises a peripheral wall 10A in which the filter element is housed. The wall 10A has a portion that is substantially cylindrical and a domed top (FIG. 4).

The filter element subdivides the inside volume into an upstream space and a downstream space. The filter element is substantially tubular. The upstream space corresponds to an inlet space for admitting oil prior to filtering into the cartridge in the bottom portion of the filter and at its periphery. The downstream space corresponds to a space containing oil that has been filtered and is located inside the filter-forming tube.

The cartridge 8 is designed to be mounted on a support 11 that is provided on an engine block.

Figure 1:
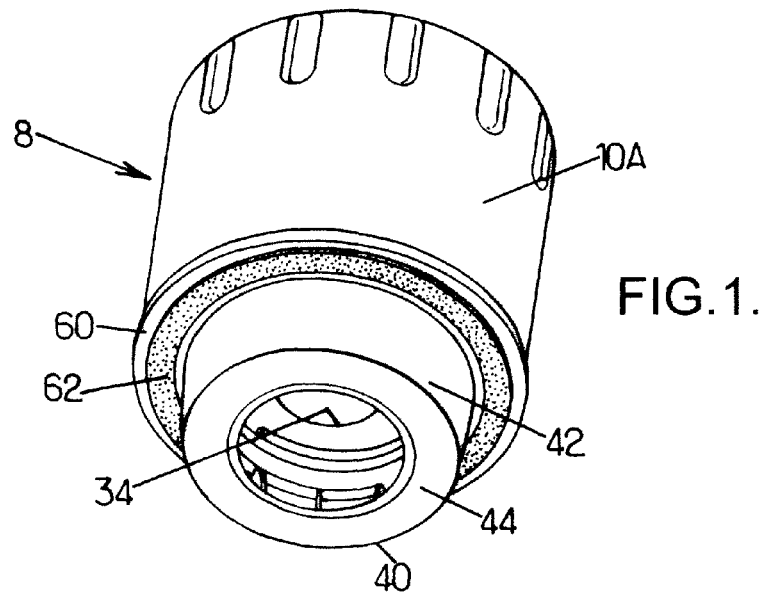
FIG. 1 is a perspective view of a filter cartridge of the invention.
Figure 2A:
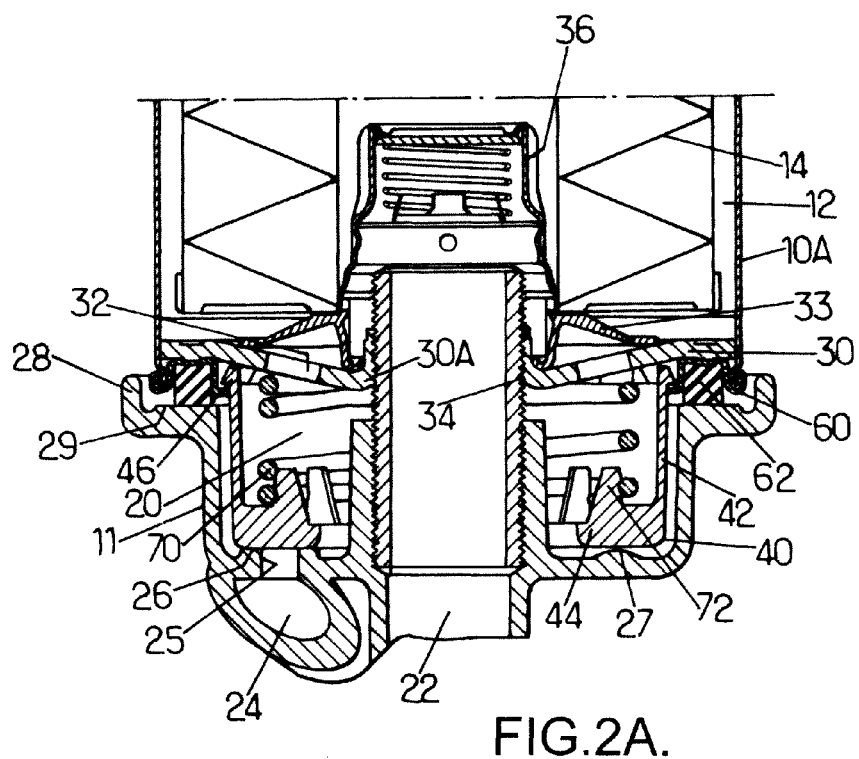
FIG. 2A is a fragmentary section of a filter cartridge of the invention in a first embodiment.
Figure 2B:
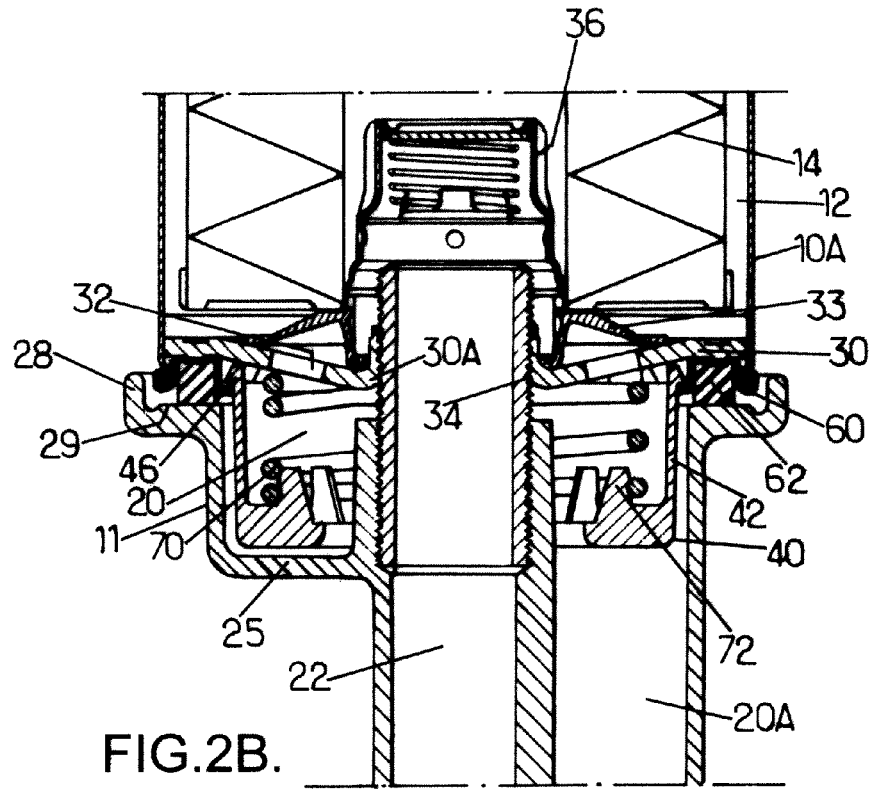
FIG. 2B is a fragmentary section of a filter cartridge of the invention in the first embodiment, the section being a section that corresponds to that of FIG. 2A but that is angularly offset from the section of FIG. 2A so as to show an inlet channel of the support.

The support 11 includes an inlet channel 20A (FIG. 2B) and an outlet channel 22. The support 11 also has a drain channel 24 (FIG. 2A).

The inlet channel 20A is axial and opens out into an annular inlet housing 20 defined by the support 11. The inlet channel 20A is the annular housing 20 defining an inlet volume.

The drain channel 24 is connected to the annular inlet housing 20. It is normally closed to avoid liquid being drained instead of being filtered.

The support 11 includes a sealing portion in relief 26 projecting into the annular housing 20. The sealing portion in relief defines an inlet 25 of the drain channel 24 that is normally closed by a closure member 40. The support includes a balancing portion in relief 27 projecting into the annular housing, diametrically opposite the sealing portion in relief 26 in the example shown. In the example shown, there is a single balancing portion in relief 27 corresponding to the sealing portion in relief 26. In a variant (not shown) it is possible to provide a plurality of balancing portions in relief, e.g. two balancing portions in relief which, together with the sealing portion in relief, are angularly distributed in regular manner. In a variant (not shown), the sealing portion in relief can present an annular shape centered on the outlet channel, and also form the balancing portion in relief.

When the axis of the cartridge is inclined, the inlet 25 in the sealing portion in relief 26 is placed in a low zone of the annular housing 20 so as to limit as much as possible the residual quantity of oil that remains in said housing after the cartridge has been removed.

The inlet channel 20A is offset angularly relative to the balancing portion in relief 27 which is diametrically opposite the sealing portion in relief 26.

At the periphery of the annular inlet housing 20, the support includes an outwardly-directed annular shoulder that forms a sealing surface 29 co-operating with sealing means of the cartridge.

The support 11 has an outer annular margin 28 at the periphery of the sealing surface 29. The margin surrounds the bottom end of the peripheral wall 10A of the casing 10.

In addition to its peripheral wall 10A, the casing includes a bottom end wall 30.

The end wall 30 defines at least one liquid inlet passage 32 comprising a plurality of orifices formed in the end wall. The orifices communicate with the periphery of the inside volume via a non-return membrane 33 situated in the bottom of the casing. The membrane 33 is open when the liquid flows under pressure from the inlet channel 20A towards the inside volume 12 of the casing.

The end wall also includes an outlet passage 34 that is central, with a thread for fastening the cartridge on a sleeve of the outlet channel of the support. The orifices forming the inlet passage 32 are thus situated around the outlet passage 34 of the cartridge.

In the downstream space, the cartridge includes an anti-drainage valve 36 connected to the outlet passage 34 and adapted to open only when the pressure that prevails in the downstream space is greater than a predetermined value.

When the cartridge is mounted tightly on the support 1, in its normal operating position as shown in FIG. 2, the inlet channel 20A of the support communicates with the inlet passage 32 of the cartridge. The outlet channel 32 of the support communicates with the outlet passage 34 of the cartridge. The inlet 25 of the drain channel 24 is closed by the closure member 40.

The cartridge can be removed from its support. The valve 36 is then closed in order to prevent the inside volume of the filter emptying via the outlet passage. The anti-return membrane 33 is closed to avoid the inside volume of the filter emptying via the inlet passage.

According to the invention, the filter cartridge includes a closure member 40 that closes the inlet 25 of the drain channel 24 when the cartridge is mounted on the support in its normal operation position. According to the invention, the closure member 40 is fitted to the cartridge, thus making it possible to avoid mounting a closure member for the drain channel that is fitted to the engine. The closure member 40 is mounted to move with lost motion relative to the end wall 30 of the casing. It is resiliently biased away from the end wall to compensate for clearances in its normal utilization position. The spring-loaded closure member 40 that is mounted to move with lost motion serves to ensure that in the normal utilization position the closure member comes into contact with the sealing portion in relief 26 and closes the inlet 25 of the drain channel 24 in effective manner.

In the embodiments shown in the figures, the closure member 40 has an annular side wall 42. The side wall 42 is substantially cylindrical and extends about the central axis of the cartridge between a first end close to the end wall and a second end remote therefrom.

Figure 3:
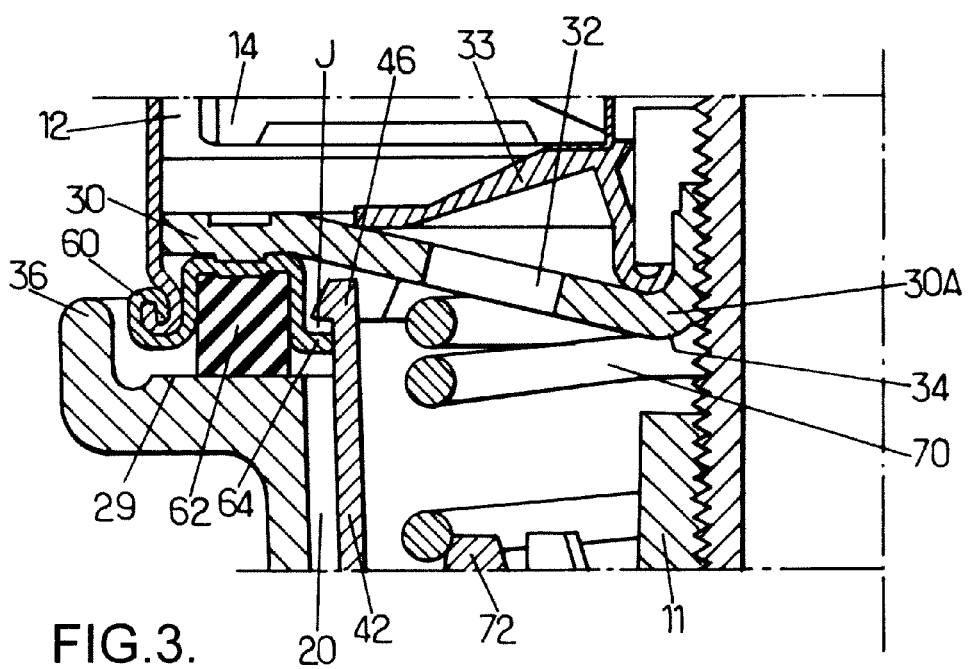
FIG. 3 is a view showing a detail of FIG. 2.

When the closure member is fitted to the end wall 30, it is the first end of the side wall 42 that is fitted to the end wall. In this example, the closure member 40 is fitted to the end wall 30 of the casing with a certain amount of axial clearance J (FIG. 3), while being resiliently biased away from the end wall. The first end of the side wall 42 of the closure member 40 has at least one outwardly-projecting rim that co-operates with a corresponding member of the end wall by catching it. In this example, the projecting rim is an annular hook 46 of the snap-fastening type. In a variant, the projecting rim could comprise a plurality of hooks, e.g. three, forming snap-fastening annular sectors that are regularly distributed.

The second end of the side wall of the closure member is extended radially inwards by an inwardly-directed collar 44. The collar 44 comes into leaktight contact against the support, closing the inlet 25 of the drain channel in the sealing portion in relief 26.

Thus, the drain channel is closed when the cartridge is mounted on the support with compensation for the dimensional dispersions that might exist in the support and in the cartridge. When removing the cartridge from the support, the closure member moves relative to the end wall of the casing and then relative to the support so as to release the inlet of the drain channel.

The end wall 30 of the casing 10 has a bottom plate 30A in which the orifices of the inlet passage 32 are formed and having the outlet passage 34 formed in the center thereof. The plate is connected to the bottom end of the peripheral end 10A of the casing.

The end wall 30 of the casing 10 includes a stamped metal washer 60 that is connected to the bottom plate 30A and that forms the periphery of the casing. At its periphery, the washer 60 is crimped to the bottom end of the peripheral wall 10A of the casing.

The washer 60 includes an annular groove extending in towards the inside volume of the casing. The groove houses a sealing gasket 62.

The sealing gasket 62 forms an annular sealing bearing surface for the end wall 30 of the casing 10 for coming into leaktight contact with the support. The sealing bearing surface surrounds the side wall 42 of the closure member.

Extending towards the inside of the annular groove, the washer 60 includes an inwardly-directed rim 64. The rim 64 forms a shoulder for catching the closure member 40 against the end wall 30. Each hook 46 of the closure member 40 is a male catch portion having an outwardly-projecting rim that co-operates by catching said inwardly-directed rim 64. Each hook 46 co-operates with a catch cavity defined by the rim 64 and the inside surface of an inside wall defining the groove.

In order to enable the closure member to move relative to the end wall of the casing, through the axial clearance J, the height of the catch cavity, i.e. the distance between the plate 30A and the rim 64 in this example, is greater than the height of the head of the hook 46 forming the catch portion. It should be observed that the height of the margin 28 of the support corresponds at least to the lost motion of the closure member relative to the end wall of the casing, i.e. to the height of the catch cavity. Said lost motion and said height need also to compensate for the compression of the gasket 62 when the cartridge is tightened onto the support.

In the embodiment shown in FIGS. 1 to 4, the closure member is resiliently biased by a helical spring 70 interposed between the end wall 30 of the casing and said inwardly-directed collar 44 of the annular side wall 42. The collar 44 includes centering fingers 72 extending towards the end wall 30 of the casing 10 for the purpose of centering the spring 60 on the axis of the cartridge.

Figure 5:
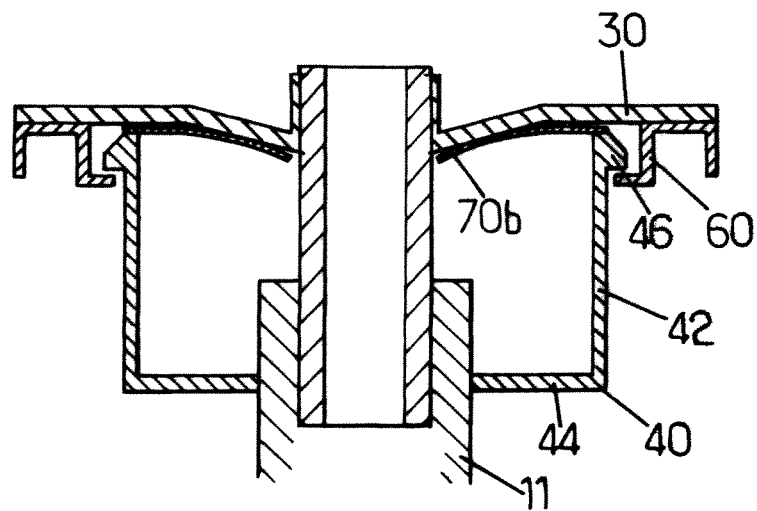
FIG. 5 is a diagrammatic view of a variant embodiment.

In the embodiment shown in FIG. 5, the spring comprises a resilient ring 70B extending radially between an outer first end connected to the side wall 42 of the closure member and an inner second end bearing against the end wall 30 of the casing.

In a variant of the embodiment shown in FIG. 5, the spring is constituted by spring blades, each having an outer first end connected to the side wall 42 of the closure member. Each blade extends radially inwards. The inner second end of each blade bears against the end wall 30 of the casing, specifically the bottom plate 30A. For example, there may be three blades spaced apart 120° that can be interconnected at their outer ends by an outer ring.

Figure 6:
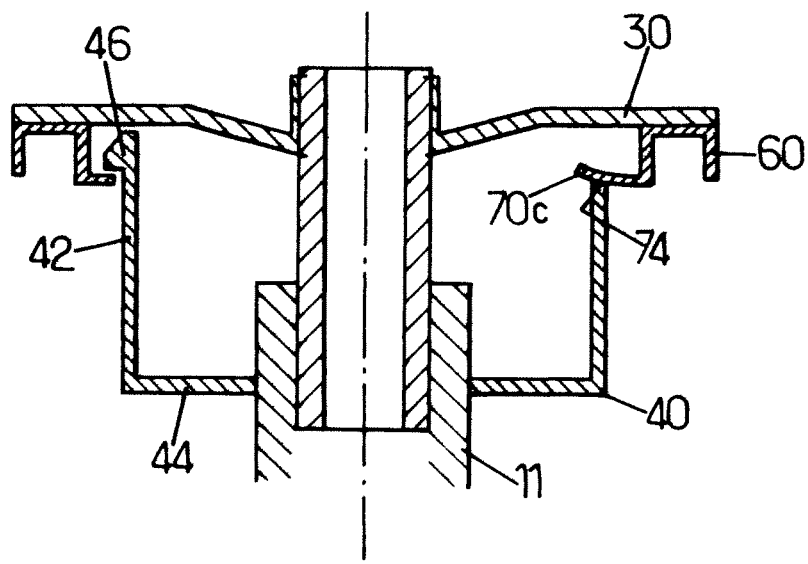
FIG. 6 is a diagrammatic view of another variant embodiment.
Figure 8:
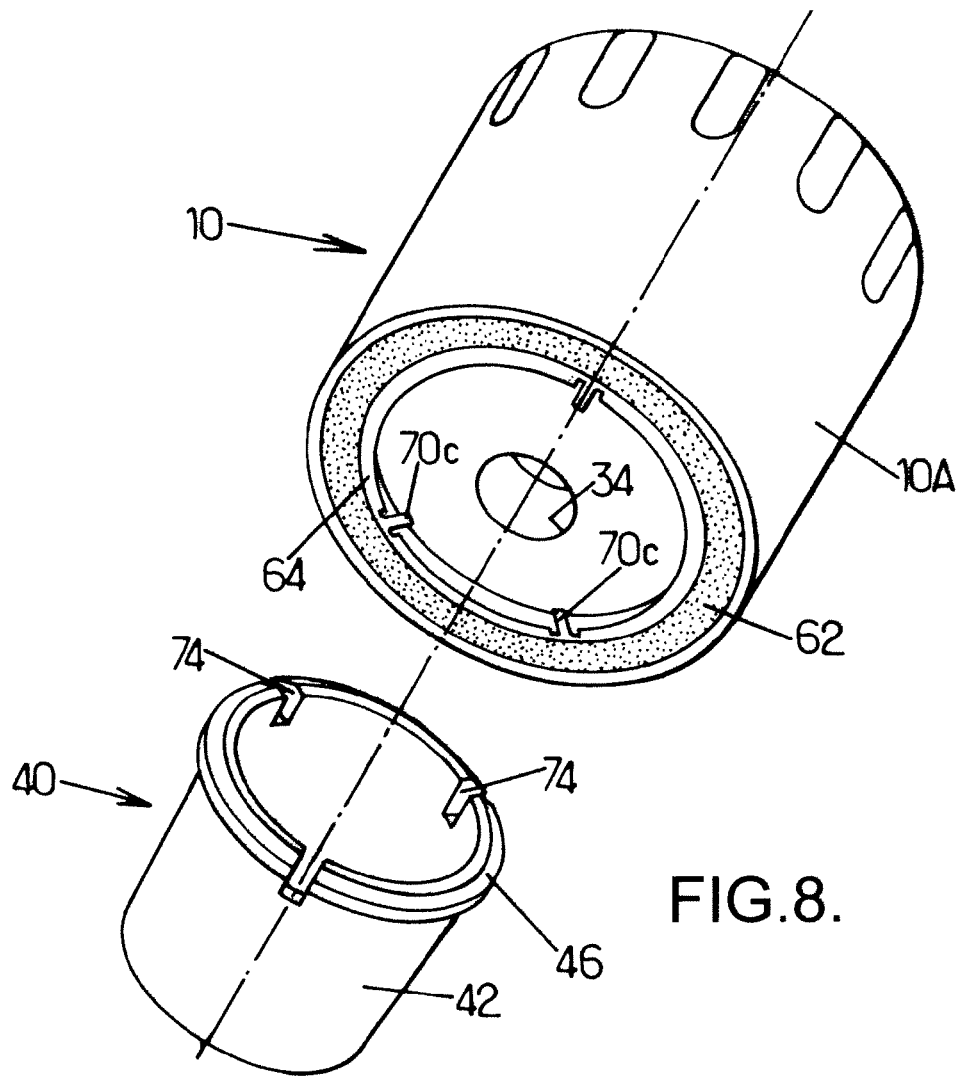
FIG. 8 is a perspective view of the FIG. 6 embodiment, showing the casing and its closure member separated therefrom in perspective.

In the embodiment shown in FIGS. 6 and 8, the spring is likewise constituted by three radial spring blades 70c, but the first end of each blade is connected to the washer 60, via the inwardly-directed rim 64. The blades are formed by cutting and folding the washer 60 in a particular manner. Notches 74 are arranged in the top portion of the side wall 42, dividing the outwardly-directed rim forming the catch portion of the closure member into a plurality of arcs. The projecting rim thus has a plurality of hooks, specifically three hooks, forming angular snap-fastening sectors that are regularly distributed and that are separated by the notches 74.

Figure 7:
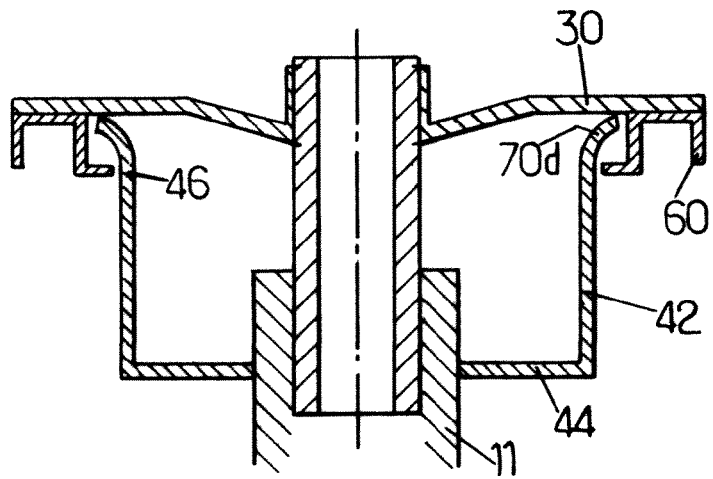
FIG. 7 is also a diagrammatic view of another variant embodiment.

In the embodiment shown in FIG. 7, the spring is constituted by spring blades 70d, each of which is connected at an inner first end to the side wall 42 of the closure member. The blades 70d flare outwards so that their outside ends bear against the end wall 30 of the casing. In this example, the blades 70d form both the spring and the outwardly-directed rim acting as a portion enabling the closure member 40 to catch against the end wall 30 of the casing.

Advantageously, when the filter is being removed (FIG. 4), the liquid remains in the inlet housing 20 so as to flow via the drain channel 24 when the closure member is in low abutment relative to the end wall of the casing.

In a first stage of removing the cartridge, because of the clearance J, the closure member 40 does not yet release the inlet 25 of the drain channel 24. Given the lost motion of the closure member 40 relative to the end wall 30, and also the resilient return away from the end wall, the time at which the drain channel 24 opens to come into communication with the inlet housing 20 is delayed until a second stage of removal, as shown in FIG. 4. During the second stage of removal, the closure member is in low abutment relative to the end wall 30, with the oil that exists between the support 11 and the end wall 30 then flowing.

The liquid needs to be retained in the support 11 during the first stage of removal.

Advantageously, the gasket 62 presents a resilient compression range greater than the height of the clearance J for the lost motion. The height of the gasket 62 at rest, when the cartridge is removed from the support, is greater than the height of the clearance J. The resilience of the gasket is advantageously sufficient to provide a resilient stroke enabling it to perform sealing during the lost motion stroke of the closure member 40 relative to the end wall 30 of the casing and during the additional opening stroke between the closure member and the sealing portion in relief 28.

If the cartridge is removed very quickly with the gasket 62 relaxing while the level of liquid is high in the housing 20, then the margin 28 enables the liquid to be retained in the support 11 so as to prevent it flowing away when beginning to remove the cartridge.

If the gasket is not tall enough or sufficiently resilient to be able to guarantee sealing between the support 11 and the housing 10, then the margin 28 serves to retain the liquid in the support 11 during the first stage of removing the cartridge, i.e. before the liquid flows into the drain channel 24.

The margin is particularly advantageous when the axis of the cartridge is inclined relative to the vertical.

In the embodiment shown, the cartridge includes an anti-drainage valve 36 and a non-return membrane 33. An advantage of the invention is that, when the cartridge does not have a non-return membrane and/or the cartridge does not have an anti-drainage valve, it is still possible to drain the volume of liquid contained in the casing cleanly.

Figure 9A:
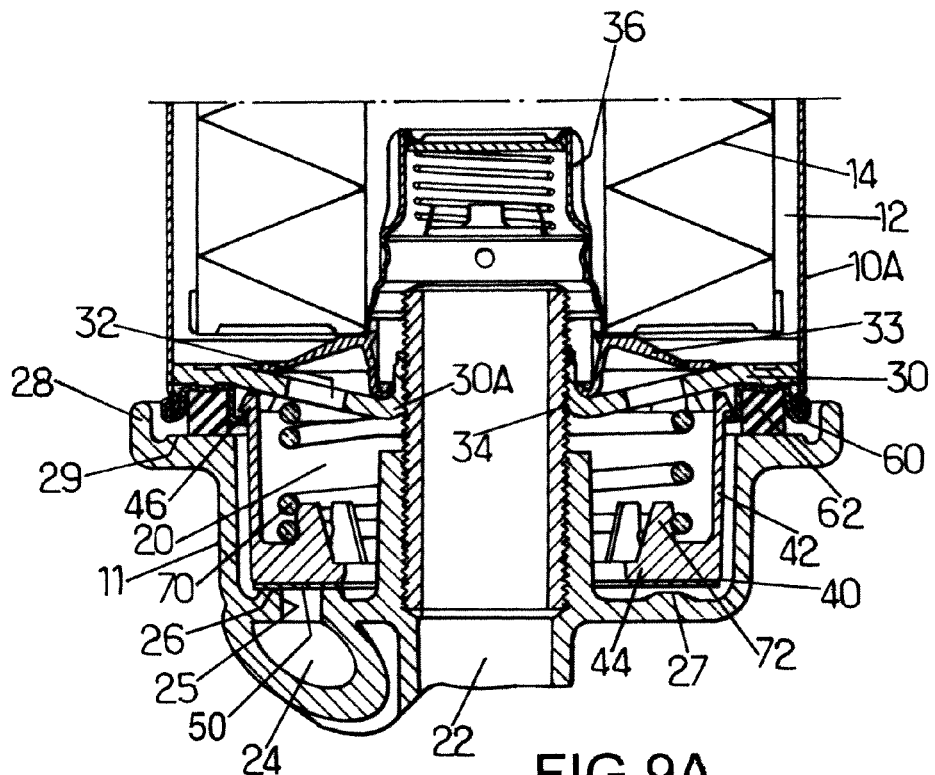
FIG. 9A is a fragmentary section like FIG. 2A showing a filter cartridge in accordance with the first embodiment with the exception of an added gasket.
Figure 9B:
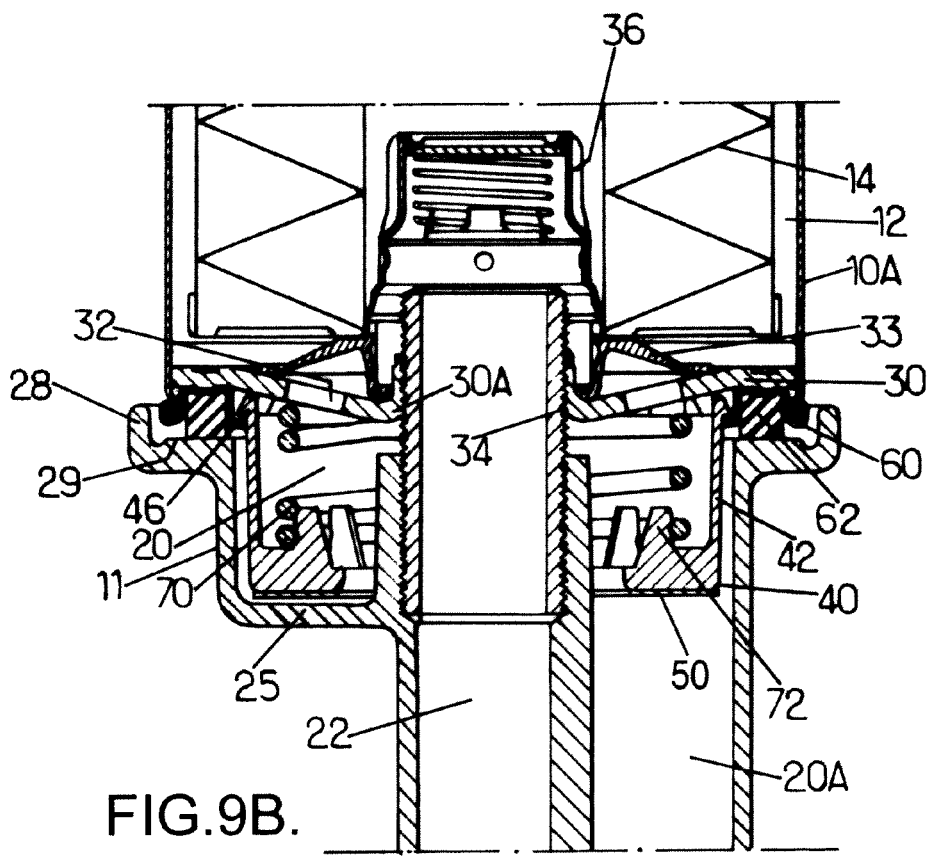
FIG. 9B is a fragmentary section of the FIG. 9A filter cartridge, the section being angularly offset relative to that of FIG. 9A so as to show the inlet channel of the support.

With reference to FIGS. 9A and 9B, the support 11 may be provided with a gasket 50 that is fastened on a bottom face of the closure member 40. For example it can be a heat-sealable gasket (made of elastomer, rubber, or analogous sealing material) that is engaged by heat-sealing under the closure member 40. More generally, the person skilled in the art will understand that the gasket may constitute a flexible part of appropriate shape (e.g. washer shape) that is suitable for being fastened against a rigid part, where fastening can be selected from the techniques of adhesive-bonding, heat-sealing, vulcanization, or overmolding. As shown in FIG. 9A, the drain channel 24 is closed in leaktight manner by the gasket 50 when the cartridge 8 is mounted on the support 11. The closure member 40 may thus include a cup under which a sealing washer is fastened to isolate the drain channel 24 more effectively. The cup is connected via its top portion to the end wall 30 of the casing 10.

The shape of the gasket 50 may be annular, being optionally in a centered position around the outlet channel 22. The gasket 50 closes the axial inlet channel 20A in part or not at all, so as to allow the channel to open out into the annular inlet housing 20, as shown in FIG. 9B. In the non-limiting example of FIGS. 9A and 9B, the section of the orifice of the support 11 for communicating with the drain channel 24 is sufficiently small to be completely closed by an annular portion of the gasket 50, while the orifice formed in the support 11 through which oil arrives is sufficiently large, extending radially and/or being offset radially, to ensure that it is not closed by the gasket 50. It will be understood that the gasket 50 bears axially on a surface of the support 11 facing the base of the closure member 40. The gasket 50 may, in contrast, remain at a distance from the side walls of the support 11.

The invention claimed is:

1. A filter cartridge for filtering a liquid, the cartridge comprising an outer casing defining an inside volume;
    a filter element contained in said inside volume of the outer casing, the filter element separating said inside volume into an upstream space and a downstream space, wherein the casing includes an end wall defining at least one liquid inlet passage communicating with the upstream space, and a liquid outlet passage communicating with the downstream space, the liquid outlet passage of the end wall being central and provided with a thread, said casing being adapted to be mounted on a threaded support that includes a liquid inlet channel designed to communicate with the inlet passage, a liquid outlet channel designed to communicate with the outlet passage, and a drain channel communicating with the inlet passage,
    wherein the cartridge includes a closure member fastened to said end wall of the casing;
    wherein the closure member extends entirely outside said inside volume and includes an annular side wall, the side wall of the closure member including a first end disposed adjacent to the end wall and a second end disposed remote from the end wall, said annular side wall extending around a central axis between the first end and the second end, the first end of the sidewall disposed to form an axial clearance with respect to the end wall so that the closure member is axially movable with respect to the end wall between a proximal position disposed toward the end wall and a distal position disposed away from the end wall;
    the end wall including an annular sealing bearing surface surrounding the side wall and adapted to come into sealing contact with the support; and
    wherein the second end of the side wall of the closure member is extended radially inwards by an inwardly-directed collar; and
    wherein the filter cartridge comprises a resilient member arranged between the end wall and a portion of the closure member remote from the end wall, whereby the closure member is resiliently biased away from the end wall.

2. The filter cartridge according to claim 1, wherein the end wall comprises an inwardly projecting rim in contact with the first end of the closure member, and wherein the at least one liquid inlet passage is arranged in the end wall between the liquid outlet passage and the inwardly projecting rim.

3. The filter cartridge according to claim 1, wherein the collar of the closure member includes a circumferentially continuous annular gasket.

4. The filter cartridge according to claim 3, wherein the resilient member comprises a coil spring provided with an end that is in contact with the end wall and surrounds the liquid outlet passage.

5. The filter cartridge according to claim 4, wherein the end wall of the casing includes an inwardly-directed rim, and the first end of the side wall of the closure member includes at least one outwardly-projecting hook, the hook arranged to catch the rim when the closure member has moved a distance at least equal to the axial clearance.

6. The filter cartridge according to claim 5, wherein the inwardly-directed rim is a metal washer crimped to a peripheral wall of the casing, the washer carrying a gasket, the gasket constituting a sealing bearing surface.

7. The filter cartridge according to claim 3, wherein resilient member comprises at least one spring interposed between the end wall of the casing and the annular side wall.

8. The filter cartridge according to claim 1, wherein the closure member includes a gasket.

9. The filter cartridge according to claim 3, wherein the annular gasket is a heat-sealable gasket.

10. The filter cartridge according to claim 1, wherein the closure member includes a base fitted with an annular gasket enabling the drain channel to be closed in leaktight manner when the cartridge is mounted on the support.

11. The filter cartridge according to claim 7, wherein the spring comprises a resilient ring extending radially between an outer first end connected to the side wall of the closure member, and an inner second end bearing against the end wall of the casing.

12. The filter cartridge according to claim 7, wherein the spring comprises spring blades each having a first end connected to the side wall of the closure member and an opposite end bearing against the end wall of the casing.

13. The filter cartridge according to claim 7, wherein the spring is a spring blade secured to the end wall of the casing and engaged in a notch formed in the first end of the annular side wall, said notch being open towards the end wall.

14. The filter cartridge according to claim 1, wherein the resilient member comprises a helical spring interposed between the end wall of the casing and said inwardly-directed collar.

15. The filter cartridge according to claim 14, wherein the collar includes centering fingers extended towards the end wall of the casing and co-operating with said helical spring.

16. The filter cartridge according to claim 1, wherein the first end of the side wall includes a hook, and including a rim operatively coupled to a peripheral wall of the casing wall, and wherein the axial clearance space is defined between the hook and the rim, the hook, the rim and the axial clearance cooperating to form a lost motion connection between the closure member and the rim.

17. The filter cartridge according to claim 1, wherein the casing includes a sealing bearing surface gasket, the sealing bearing surface gasket positioned on the casing to make contact with the support when the filter cartridge is mounted to the support, and wherein the sealing bearing surface gasket is compressible through a range of motion that is greater than the axial clearance.

18. The filter cartridge according to claim 1, including an anti-drainage valve connected to the outlet passage and adapted to open only when the pressure prevailing in the downstream space is greater than a predetermined value.

19. The filter cartridge according to claim 1, wherein the closure member is a one-piece element extending annularly at a distance from the thread.

20. A filter cartridge for filtering a liquid, the cartridge comprising:
an outer casing defining an inside volume;
a filter element contained in the inside volume of the outer casing, the filter element separating the inside volume into an upstream space and a downstream space;
the casing including an end wall defining at least one liquid inlet passage communicating with the upstream space, and a liquid outlet passage communicating with the downstream space;
the liquid outlet passage of the end wall being centrally located and including threads;
the casing arranged to be mountable on a support;
wherein the cartridge includes a closure member fastened to the end wall of the casing, the closure member separated from the inside volume of the casing by the end wall, the closure member including a first end disposed adjacent the end wall, a second end remote from the first end, and an annular sidewall;
a spring disposed outside the inside volume of the casing and bearing against the closure member;
wherein the closure member is shiftable between a first position in which the first end is spaced away from the end wall by a first distance, and a second position in which the first end is spaced away from the end wall by a second distance greater than the first distance; and
wherein the closure member defines a free end of the filter cartridge remote from the end wall, the free end including an annular face adapted to form a seal.

21. The filter cartridge according to claim 20, wherein the closure member includes an inwardly-directed annular collar extending inwardly from the annular sidewall and coupled to the second end of the closure member.

22. The filter cartridge according to claim 21, wherein the side wall includes a washer and terminates in an inwardly extending rim, and including an outwardly extending annular hook disposed adjacent the first end of the annular sidewall of the closure member, the closure member and the annular hook arranged such that the annular hook engages the inwardly extending rim when the closure member approaches the first position and disengages the inwardly extending rim when the closure member approaches the second position.

* * * * *